(12) United States Patent
Son et al.

(10) Patent No.: US 8,538,439 B2
(45) Date of Patent: Sep. 17, 2013

(54) COMMUNICATIONS SYSTEM CONFIGURED TO CORRECT AN ASSOCIATION MISMATCH AND RELATED METHODS

(75) Inventors: Giyeong Son, Mississauga (CA); Bruno R. Preiss, Waterloo (CA); Graeme Whittington, Toronto (CA); Michael Rogan, Kitchener (CA); Graham Russell, Cambridge (CA)

(73) Assignee: Blackberry Limited, Waterloo, Ontario (CA)

( * ) Notice: Subject to any disclaimer, the term of this patent is extended or adjusted under 35 U.S.C. 154(b) by 243 days.

(21) Appl. No.: 13/025,516

(22) Filed: Feb. 11, 2011

(65) Prior Publication Data

US 2012/0208586 A1 Aug. 16, 2012

(51) Int. Cl.
*H04W 36/00* (2009.01)
*H04W 24/00* (2009.01)
*H04W 72/00* (2009.01)
*H04M 1/00* (2006.01)

(52) U.S. Cl.
USPC ........... 455/442; 439/561; 439/436; 439/423; 439/453; 439/455

(58) Field of Classification Search
USPC ............... 455/423, 425, 445, 453, 428, 436, 455/442, 456, 439, 455
See application file for complete search history.

(56) References Cited

U.S. PATENT DOCUMENTS

| 6,546,425 | B1 | 4/2003 | Hanson et al. ................ 709/227 |
| 6,834,186 | B1 | 12/2004 | Gallagher et al. ............ 455/411 |
| 7,649,881 | B2 | 1/2010 | Casey ........................... 370/389 |
| 2004/0213181 | A1 | 10/2004 | Grech et al. .................. 370/331 |
| 2004/0242154 | A1 | 12/2004 | Takeda et al. ................... 455/16 |
| 2005/0014498 | A1* | 1/2005 | Yamada et al. ............... 455/428 |
| 2010/0061264 | A1 | 3/2010 | Campbell et al. ............. 370/253 |
| 2011/0014919 | A1* | 1/2011 | Otte et al. ..................... 455/442 |
| 2011/0299422 | A1* | 12/2011 | Kim et al. ..................... 370/253 |

FOREIGN PATENT DOCUMENTS

EP 1 826 963 8/2007

* cited by examiner

*Primary Examiner* — Ping Y Hsieh
*Assistant Examiner* — Xin Jia
(74) *Attorney, Agent, or Firm* — Allen, Dyer, Doppelt, Milbrath & Gilchrist, P.A.

(57) ABSTRACT

A communications system includes a service provider device, a mobile wireless communications device, and a plurality of communication infrastructure nodes. The plurality of communication infrastructure nodes are configured to generate an association mismatch communications path between the service provider device and the mobile wireless communications device, the association mismatch communications path including at least two communication infrastructure nodes in series. The plurality of communications infrastructure nodes are also configured to generate a corrected association communications path between the service provider device and the mobile wireless communications device from the mismatch communications path, the corrected association communications path including just a single communication infrastructure node from the at least two communication infrastructure nodes.

17 Claims, 7 Drawing Sheets

COMMUNICATIONS SYSTEM CONFIGURED TO CORRECT AN ASSOCIATION MISMATCH AND RELATED METHODS

TECHNICAL FIELD

The present disclosure relates to the field of communications systems, and, in particular, to communication infrastructure nodes for communications systems that are configured to correct an association mismatch.

BACKGROUND

Mobile wireless communications devices have become pervasive in today's society. Many individuals own such mobile wireless communications devices and use them on a daily basis, both for placing voice calls and for performing other tasks. For example, some mobile wireless communications devices may now provide connectivity with the Internet, and may allow access to e-mail accounts, instant messaging accounts, and social networking sites.

Service providers, together with intermediary networks, provide for the connectivity between these mobile wireless communications devices and other mobile wireless communications devices, as well as the internet. Due to the popularity of such mobile wireless communications devices, the service providers, and especially the intermediary networks, are often congested with traffic.

This congestion can cause degradation in the quality of service delivered to the mobile wireless communications devices (i.e. poor voice connections, dropped calls, slow data connections). Consequently, it is desirable for the communications system as a whole to provide quick, efficient communications between the service providers and the mobile wireless communications devices.

DETAILED DESCRIPTION

Figure 1:
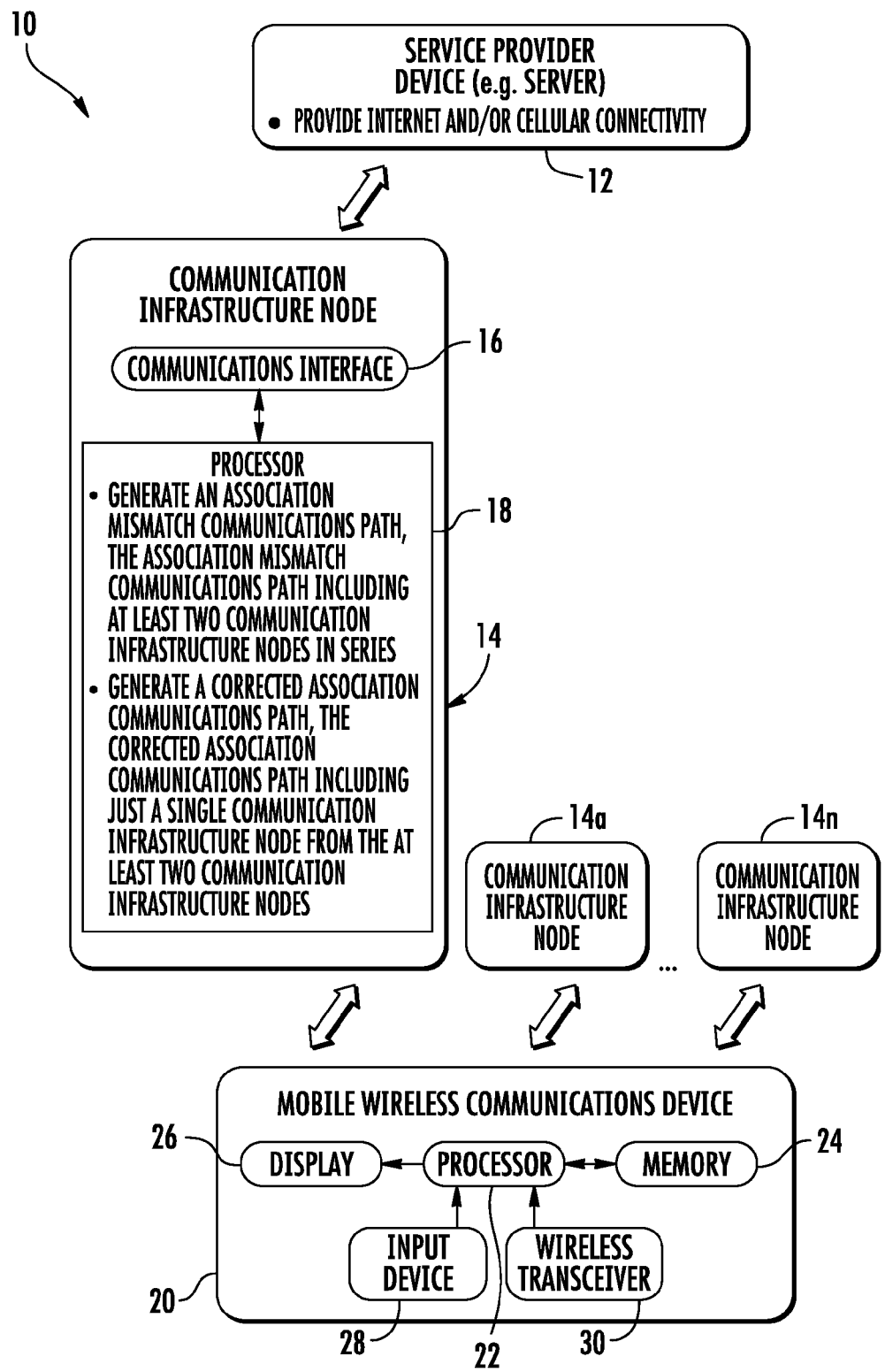
FIG. 1 is a schematic block diagram of a communications system according to the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communications system may comprise a service provider device, a mobile wireless communications device, and a plurality of communication infrastructure nodes. The plurality of communication infrastructure nodes may be configured to generate an association mismatch communications path between the service provider device and the mobile wireless communications device, the association mismatch communications path including at least two communication infrastructure nodes in series. The plurality of communications nodes may also be configured to generate a corrected association communications path between the service provider device and the mobile wireless communications device from the mismatch communications path, the corrected association communications path including just a single communication infrastructure node from the at least two communication infrastructure nodes. This advantageously reduces the load on the network, reduces routing time, and therefore increases quality of the service delivered to the mobile wireless communications device.

The at least two communication infrastructure nodes may comprise a first communication infrastructure node coupled to the service provider device, and a second communication infrastructure node coupled to the mobile wireless device. The mobile wireless communications device may be switched from the second to the first communication infrastructure node.

Additionally or alternatively, the at least two communication infrastructure nodes may comprise a first communication infrastructure node coupled to the service provider device, and a second communication infrastructure node coupled to the mobile wireless device. The service provider device may be switched from the first to the second communication infrastructure node.

Moreover, the plurality of communication infrastructure nodes may further determine whether an initially established communications path between the service provider device and the mobile wireless communications device defines an association mismatch communications path. In some applications, the service provider device may be configured to provide connectivity with a cellular network. Also, the service provider device may be configured to provide Internet connectivity.

The service provider device may comprise a service provider server. The mobile wireless communications device may comprise a wireless transceiver and a processor coupled thereto. Each communication infrastructure node may comprise a processor and a communications interface coupled thereto.

A method aspect is directed to a method of operating a communications system. The method may include generating an association mismatch communications path between a service provider device and a mobile wireless communications device, the association mismatch communications path including at least two communication infrastructure nodes, of a plurality of communication infrastructure notes, in series. The method may also include generating a corrected association communications path between the service provider device and the mobile wireless communications device from the mismatch communications path, the corrected association communications path including just a single communication infrastructure node from the at least two communication infrastructure nodes.

With initial reference to FIG. 1, a communications system 10 is now described. The communications system 10 includes a service provider device 12, such as a service provider server that provides Internet and/or cellular connectivity. The communications system 10 also includes a mobile wireless communications device 20 and a plurality of communication infrastructure nodes 14a . . . 14n for providing a communications path between the service provider device 12 and the mobile wireless communications device 20. These infrastructure nodes may be relays, cellular base stations, or servers, for example.

The mobile wireless communications device 20 comprises a processor 22 coupled to a memory 24, display 26, input device 28, and wireless transceiver 30. In addition, each communication infrastructure nodes 14a . . . 14n includes a communications interface 16 coupled to a processor 18. The communications interface 16 may include a wired transceiver, a wireless transceiver, or both a wired and a wireless transceiver, and is configured to communicate with both the service provider device 12 and the mobile wireless communications device 20.

As explained above, the communication infrastructure nodes 14a . . . 14n provide a communications path between the service provider device 12 and the mobile wireless communications device 20. This communications path enables the mobile wireless communications device 20 to access the services provided by the service provider device 12, such as connectivity with the Internet. During such operation, the mobile wireless communications device 20 and the service provider device 12 are therefore each in communication with at least one infrastructure node 14a . . . 14n.

In the course of operation of the communications system 10, it is desirable for the communications path between the service provider device 12 and the mobile wireless communications device 20 to include only one infrastructure node 14a . . . 14n to help ensure quality of service, to help reduce routing costs, and to help reduce the transaction time. That is, it is desirable that the service provider device 12 and the mobile wireless communications device 20 are each connected, or associated to the same infrastructure node 14a . . . 14n.

Unfortunately, when the initial communications path is established, or when an existing communications path is severed then re-established, the service provider device 12 and the mobile wireless communications device 20 may each be connected to a different infrastructure node 14a . . . 14n. This is known as an association mismatch. As such, it can be said that the processor 18 of at least one of the communication infrastructure nodes 14a . . . 14n generates an association mismatch communications path including at least two communication infrastructure nodes in series.

When operating in an association mismatch condition, the infrastructure node 14a . . . 14n that the service provider device 12 is connected then communicates with the infrastructure node to which the mobile wireless communications device 20 is connected in order to facilitate the communications between the service provider device 12 and the mobile wireless communications device 20.

To identify this operating condition, the processor 18 of the communications infrastructure node 14a . . . 14n to which either the service provider device 12 or mobile wireless communications device 20 is connected is configured to determine whether the initially established communications path defines an association mismatch communications path.

It should be understood that each component of the communications system 10 may have an address. That is, the service provider device 12, each communication infrastructure node 14a . . . 14n, and the mobile wireless communications device 20 may have an address. Each address may indicate whether it belongs to a mobile wireless communications device 20, a communication infrastructure node 14a . . . 14n, or the service provider device 12. Therefore, to make the determination of whether the initially established communications path defines an association mismatch path, the processor 18 checks whether the destination of communications is the mobile wireless communications device 20. If so, the processor 18 checks if that communication infrastructure node 14a . . . 14n is coupled to both the mobile wireless communications device 20 and the service provider device 12. If so, there is not an association mismatch. If not, then an association mismatch has been detected.

Figure 2:
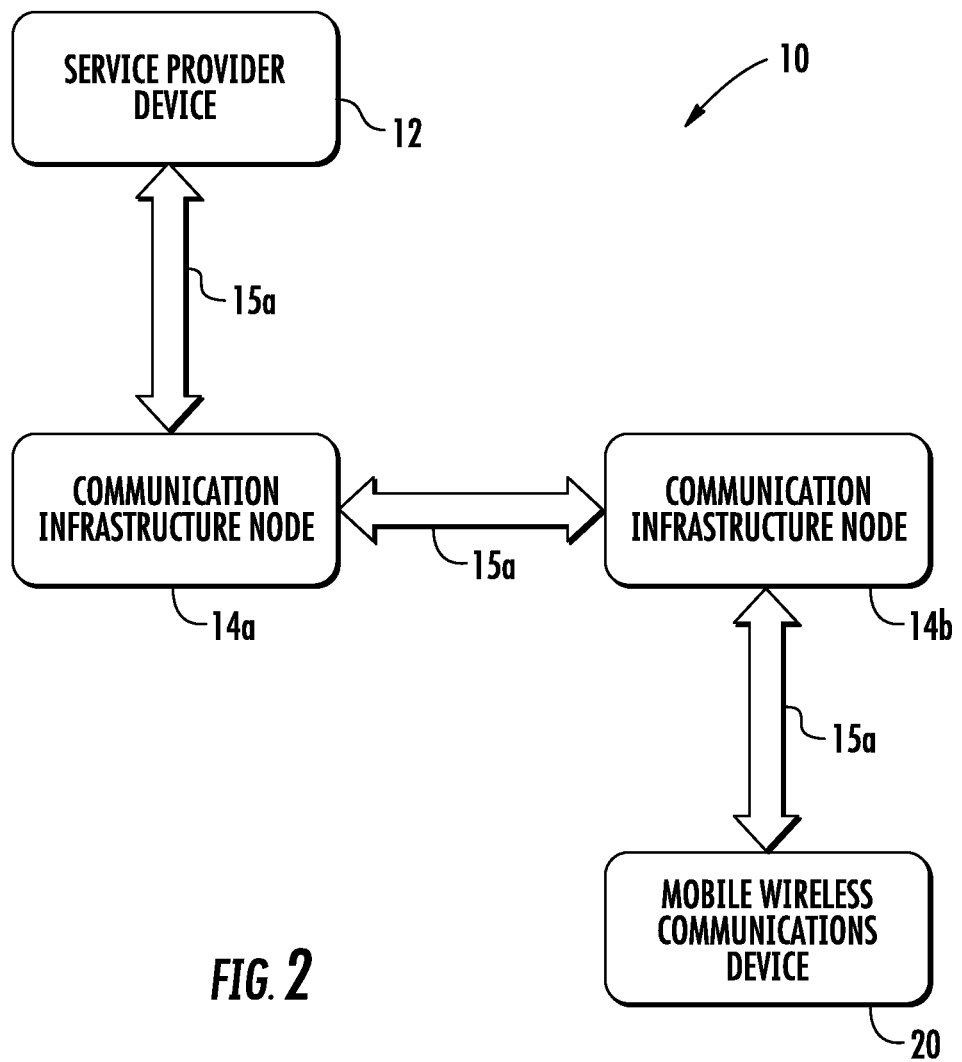
FIG. 2 is a block diagram of the communications system of FIG. 1 with an association mismatch communications path between the service provider device and the mobile wireless communications device.

Referring additionally to FIG. 2, an association mismatch situation is illustrated. Here, the service provider device 12 is associated with a first communication infrastructure node 14a, while the mobile wireless communications device 20 is associated with a second communication infrastructure node 14b. The communication infrastructure node 14b is connected to the communication infrastructure node 14a to thereby relay communications thereto from the mobile wireless communications device 20, and the communication infrastructure node 14a then relays the communications to the service provider device 12, thereby creating the association mismatch communications path 15a.

Figure 3:
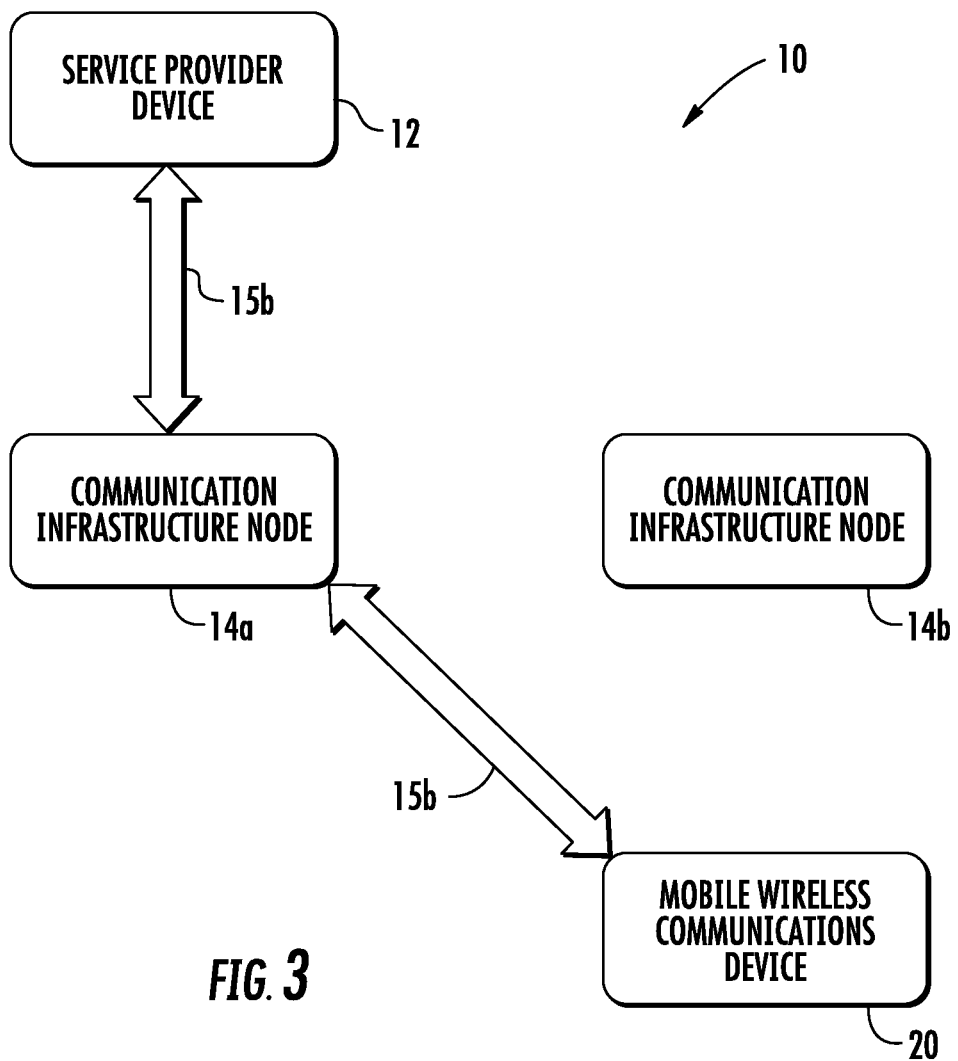
FIG. 3 is a block diagram of the communications system of FIG. 1 with a corrected association mismatch path between the service provider device and the mobile wireless communications device.

Such an association mismatch is costly in terms of processing power and routing costs, and may even reduce the speed of the connecting between the service provider device 12 and the mobile wireless communications device 20. Therefore, the processor 18 of one of the communication infrastructure nodes 14a . . . 14n generates a corrected association communications path that includes just a single communication infrastructure node. As shown in FIG. 3, the corrected association communications path 15b includes only one communication infrastructure node 14a with both the service provider device 12 and mobile wireless communications device 20 connected thereto.

As will be readily apparent to those of skill in the art, in FIG. 3, the mobile wireless communications device 20 has changed its association such that it is no longer associated with the communication infrastructure node 14b, but is instead associated with the communications infrastructure node 14a. The mobile wireless communications device 20 has done this because the processor 18 of the communication infrastructure node 14b instructed the mobile wireless communications device 20 to associate with the communications infrastructure node 14a instead.

Figure 4:
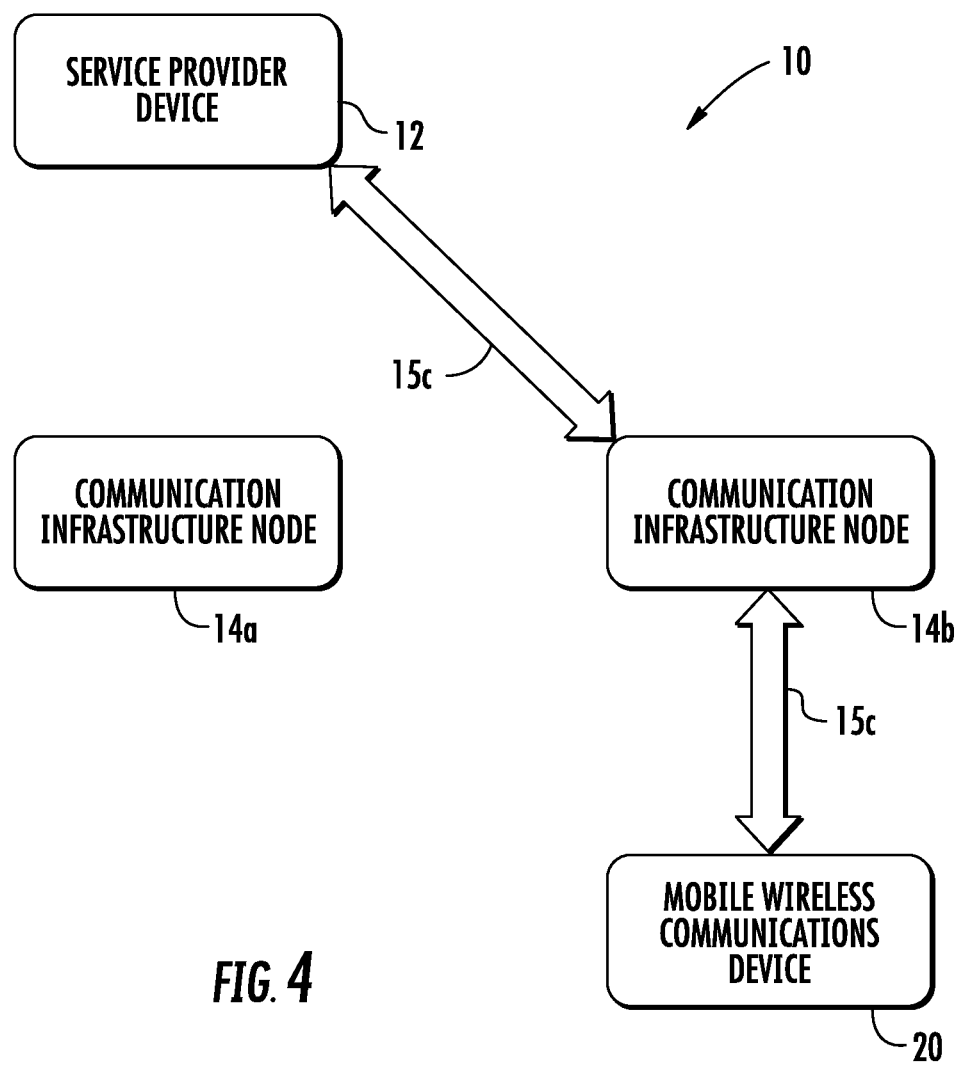
FIG. 4 is a block diagram of the communications system of FIG. 1 with a different corrected association mismatch path between the service provider device and the mobile wireless communications device.

Those skilled in the art will appreciate that there are other ways to correct the association mismatch. For example, as shown in FIG. 4, the service provider device 12 has changed its association such that it is no longer associated with the communications infrastructure node 14a, but is instead associated with the communications infrastructure node 14b. The mobile service provider device 12 has done this because the processor 18 of the communication infrastructure node 14a instructed the service provider device 12 to associate with the communications infrastructure node 14b instead.

Figure 5:
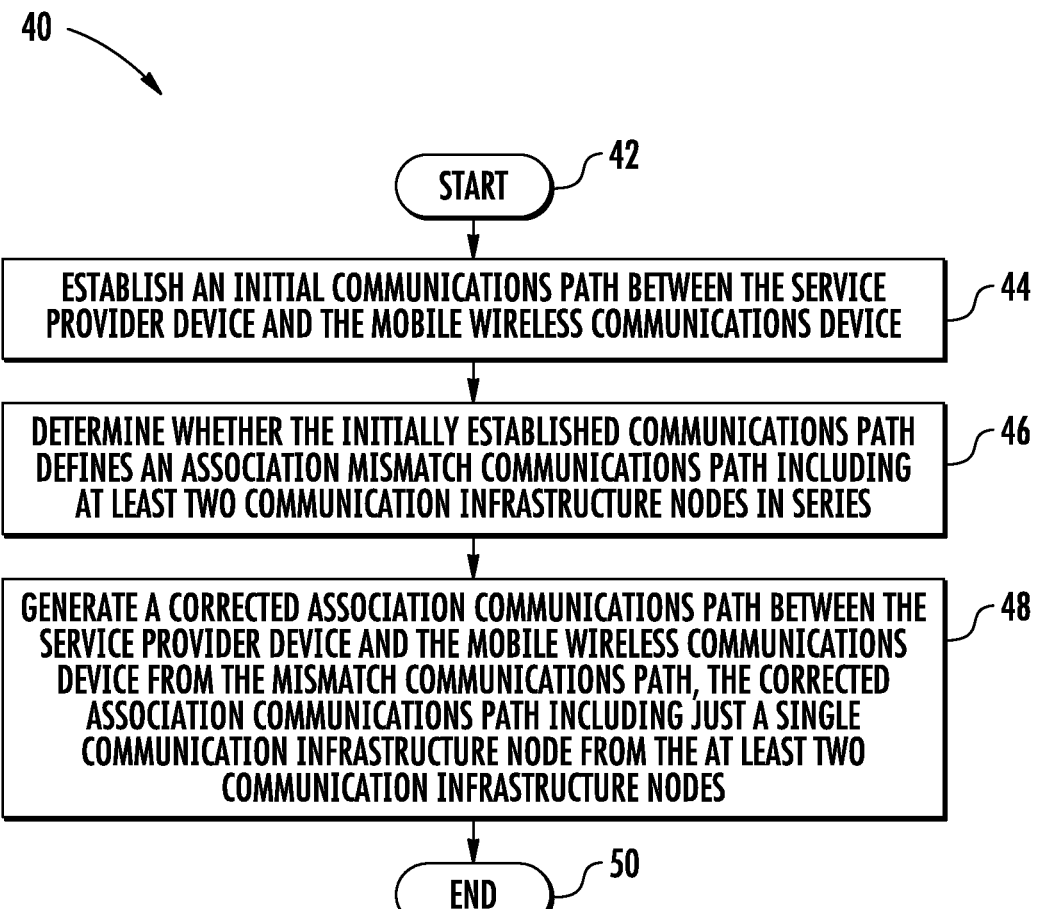
FIG. 5 is a flowchart of a method of operating the communications system of FIG. 1.

Referring now to the flowchart 40 in FIG. 5, a method of operating the communications system 10 of FIG. 1 is now described. After the start (Block 42), an initial communications path is established between the service provider device and the mobile wireless communications device (Block 44). Next, at least one of the communications infrastructure nodes determines whether the initially established communications path defines an association mismatch communications path including at least two communication infrastructure nodes in series (Block 46).

Then, one of the communications infrastructure nodes generates a corrected association communications path between the service provider device and the mobile wireless communications device from the mismatch communications path, the corrected association communications path including just a single communication infrastructure node from the at least two communication infrastructure nodes (Block 48). Block 50 indicates the end of the method.

Figure 6:
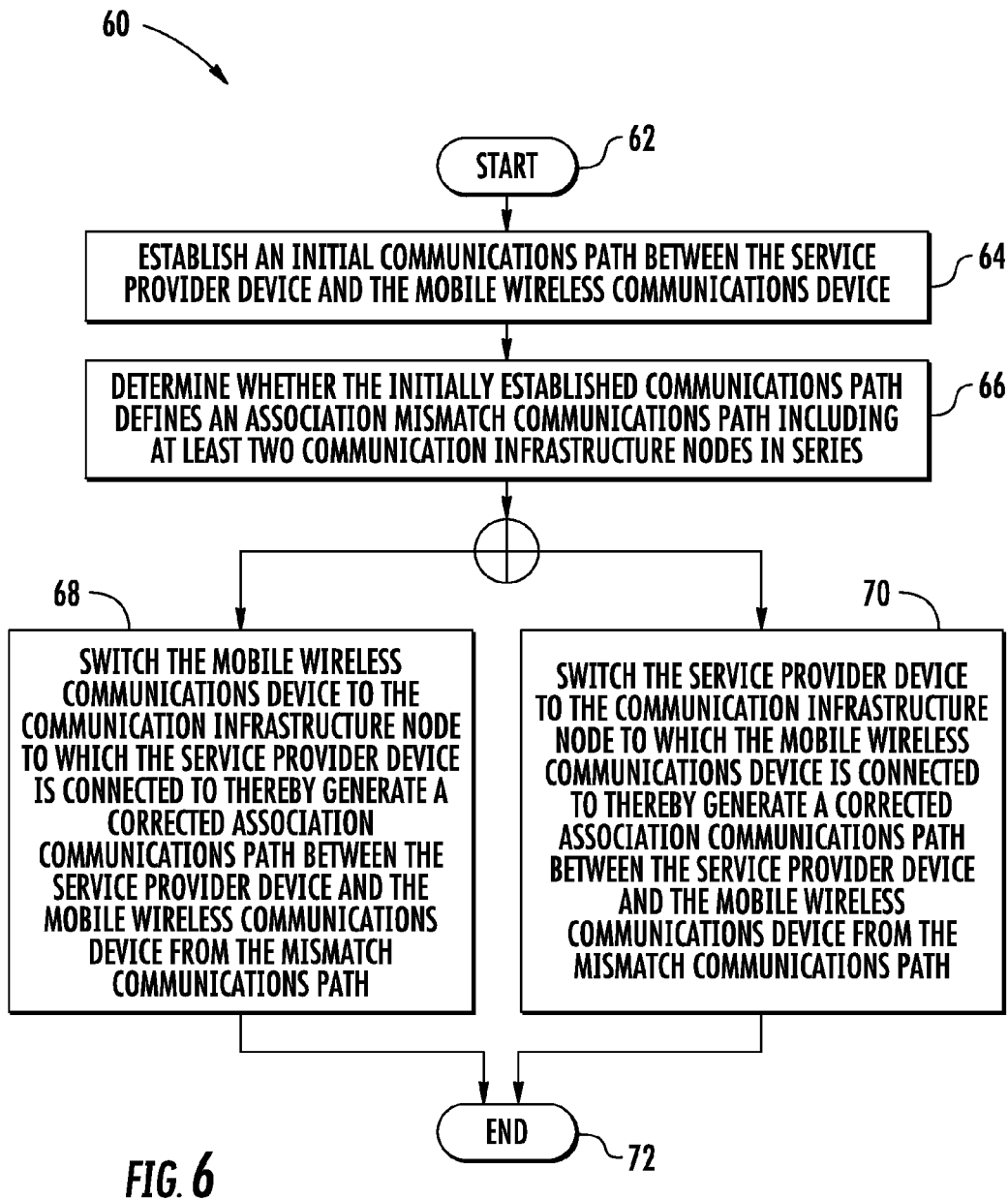
FIG. 6 is a flowchart of a more detailed method of operating the communications system of FIG. 1.

Referring now to the flowchart 60 in FIG. 6, a more detailed method of operating the communications system 10 of FIG. 1 is now described. After the start (Block 62), an initial communications path is established between the service provider device and the mobile wireless communications device (Block 64). Next, one of the communications infrastructure nodes determines whether the initially established communications path defines an association mismatch communications path including at least two communication infrastructure nodes in series (Block 66).

Next, at least one of the communications infrastructure nodes may switch the mobile wireless communications device to the communication infrastructure node to which the service provider device is connected to thereby generate a corrected association communications path between the service provider device and the mobile wireless communications device from the mismatch communications path (Block 68). Alternatively, at least one of the communications infrastructure nodes may switch the service provider device to the communication infrastructure node to which the mobile wireless communications device is connected to thereby generate a corrected association communications path between the service provider device and the mobile wireless communications device from the mismatch communications path (Block 70). Block 72 indicates the end of the method.

Example components of a mobile wireless communications device 1000 that may be used in accordance with the above-described embodiments are further described below with reference to FIG. 7. The mobile wireless communications device 1000 may function as either the electronic device described above. The device 1000 illustratively includes a housing 1200, a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400. Alternatively or additionally, the keypad 1400 may be a "soft" keypad implemented, for example, by providing images of keys on the display 1600.

The housing 1200 may be elongated vertically, or may take on other sizes and shapes (including clamshell or slider housing structures). The keypad may include a mode selection key, or other hardware or software for switching between text entry and telephony entry.

Figure 7:
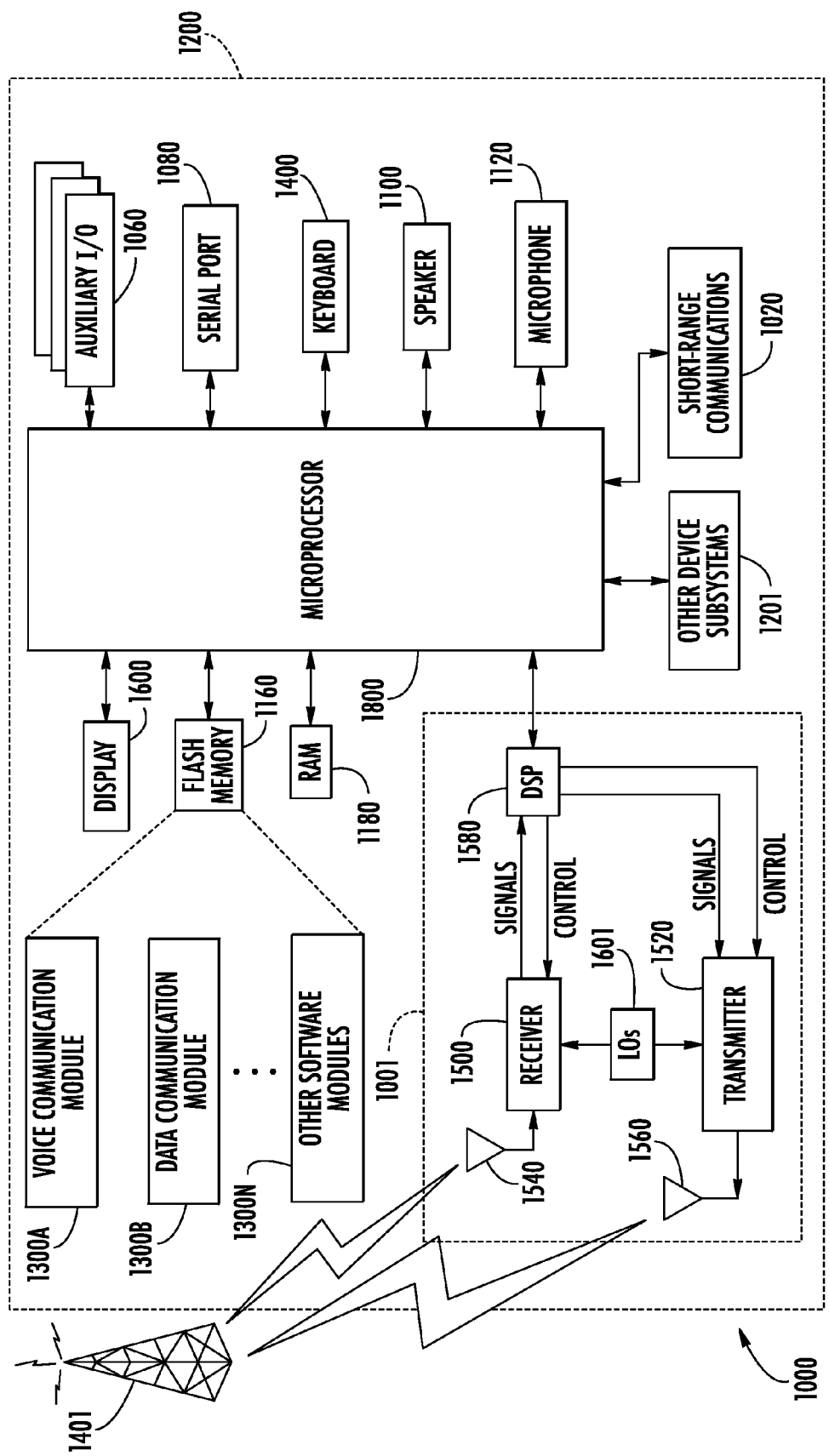
FIG. 7 is a schematic block diagram illustrating example components which may be used in the communications system of FIG. 1, in accordance with an example embodiment.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application (not shown) may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1900. The received signal is then further processed by the processing device 1800 for an output to the display 1600, or alternatively to some other auxiliary input/output (I/O) device 1060. A device may also be used to compose data items, such as e-mail messages, using the keypad 1400 and/or some other auxiliary I/O device 1060, such as a trackball, a touchpad, an optical trackpad, a rocker switch, a thumbwheel, touch sensitive display or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A communications system comprising:
a service provider device; a mobile wireless communications device; and
a plurality of communication infrastructure nodes configured to
determine when a generated communications path is an association mismatch communications path between said service provider device and said mobile wireless communications device, the association mismatch communications path including at least two communication infrastructure nodes in series, the generated communication path being determined to not be an association mismatch communication path by
determining, at a given one of said plurality of communication infrastructure nodes, if a destination of communications is said mobile wireless communications device, and
determining whether said given one of said plurality of communication infrastructure nodes is coupled to both said mobile wireless communications device and said service provider device, and
generate, when the generated communications path is determined to be an association mismatch communications path, a corrected association communications path between said service provider device and said mobile wireless communications device from said mismatch communications path, the corrected association communications path including just a single communication infrastructure node from the at least two communication infrastructure nodes.

2. The communications system of claim 1, wherein the at least two communication infrastructure nodes comprise a first communication infrastructure node coupled to said service provider device, and a second communication infrastructure node coupled to said mobile wireless device; and wherein said mobile wireless communications device is switched from said second to said first communication infrastructure node in response to an instruction from said second communication infrastructure node.

3. The communications system of claim 1, wherein the at least two communication infrastructure nodes comprise a first communication infrastructure node coupled to said service provider device, and a second communication infrastructure node coupled to said mobile wireless device; and wherein said service provider device is switched from said first to said second communication infrastructure node in response to an instruction from said first communication infrastructure node.

4. The communications system of claim 1, wherein said service provider device is configured to provide connectivity with a cellular network.

5. The communications system of claim 1, wherein said service provider device is configured to provide Internet connectivity.

6. The communications system of claim 1, wherein said service provider device comprises a service provider server.

7. The communications system of claim 1, wherein said mobile wireless communications device comprises a wireless transceiver and a processor coupled thereto.

8. The communications system of claim 1, wherein each communication infrastructure node comprises a processor and a communications interface coupled thereto.

9. A communications system for communications with a service provider device and a mobile wireless communications device, the communications system comprising:
a plurality of communication infrastructure nodes configured to
determine when a generated communications path is an association mismatch communications path between the service provider device and the mobile wireless communications device, the association mismatch communications path including at least two communication infrastructure nodes in series, the generated communication path being determined to not be an association mismatch communication path by
determining, at a given one of said plurality of communication infrastructure nodes, if a destination of communications is said mobile wireless communications device, and determining whether said given one of said plurality of communication infrastructure nodes is coupled to both said mobile wireless communications device and said service provider device, and generate, when the generated communications path is determined to be an association mismatch communications path, a corrected association communications path between the service provider device and the mobile wireless communications device from said mismatch communications path, the corrected association communications path including just a single communication infrastructure node from the at least two communication infrastructure nodes.

10. The communications system of claim 9, wherein the at least two communication infrastructure nodes comprise a first communication infrastructure node coupled to the service provider device, and a second communication infrastructure node coupled to the mobile wireless device; and wherein the mobile wireless communications device is switched from said second to said first communication infrastructure node in response to an instruction from said second communication infrastructure node.

11. The communications system of claim 9, wherein the at least two communication infrastructure nodes comprise a first communication infrastructure node coupled to the service provider device, and a second communication infrastructure node coupled to the mobile wireless device; and wherein said service provider device is switched from said first to said second communication infrastructure node in response to an instruction from said first communication infrastructure node.

12. A method of operating a communications system comprising:

determining when a generated communications path is an association mismatch communications path between a service provider device and a mobile wireless communications device, the association mismatch communications path including at least two communication infrastructure nodes, of a plurality of communication infrastructure notes, in series, the generated communication path being determined to not be an association mismatch communication path by determining, at a given one of the plurality of communication infrastructure nodes, if a destination of communications is the mobile wireless communications device, and determining whether the given one of the plurality of communication infrastructure nodes is coupled to both the mobile wireless communications device and the service provider device; and generating, when the generated communications path is determined to be an association mismatch communications path, a corrected association communications path between the service provider device and the mobile wireless communications device from the mismatch communications path, the corrected association communications path including just a single communication infrastructure node from the at least two communication infrastructure nodes.

13. The method of claim 12, wherein the at least two communication infrastructure nodes comprise a first communication infrastructure node coupled to the service provider device, and a second communication infrastructure node coupled to the mobile wireless device; and wherein the mobile wireless communications device is switched from the second to the first communication infrastructure node in response to an instruction from the second communication infrastructure node.

14. The method of claim 12, wherein the at least two communication infrastructure nodes comprise a first communication infrastructure node coupled to the service provider device, and a second communication infrastructure node coupled to the mobile wireless device; and wherein the service provider device is switched from the first to the second communication infrastructure node in response to an instruction from the first communication infrastructure node.

15. The method of claim 12, wherein the service provider device is configured to provide connectivity with a cellular network.

16. The method of claim 12, wherein the service provider device is configured to provide Internet connectivity.

17. The method of claim 12, wherein the service provider device comprises a service provider server.

* * * * *

UNITED STATES PATENT AND TRADEMARK OFFICE
CERTIFICATE OF CORRECTION

PATENT NO. : 8,538,439 B2  
APPLICATION NO. : 13/025516  
DATED : September 17, 2013  
INVENTOR(S) : Son et al.

Page 1 of 1

It is certified that error appears in the above-identified patent and that said Letters Patent is hereby corrected as shown below:

On the Title Page, Item (73)    Delete: "(73) Assignee: Blackberry Limited, Waterloo, Ontario (CA)"

Insert -- (73) Assignee: BlackBerry Limited, Waterloo, Ontario (CA) --

Signed and Sealed this  
Twelfth Day of November, 2013

Teresa Stanek Rea  
*Deputy Director of the United States Patent and Trademark Office*